(12) United States Patent
Kobayashi (10) Patent No.: US 11,997,238 B2
(45) Date of Patent: May 28, 2024

(54) CONTROLLING POWER STATES OF AN IMAGE FORMING APPARATUS

(71) Applicant: CANON KABUSHIKI KAISHA, Tokyo (JP)

(72) Inventor: Keita Kobayashi, Ibaraki (JP)

(73) Assignee: CANON KABU SHIKI KAISHA, Tokyo (JP)

( * ) Notice: Subject to any disclaimer, the term of this patent is extended or adjusted under 35 U.S.C. 154(b) by 122 days.

(21) Appl. No.: 17/568,747

(22) Filed: Jan. 5, 2022

(65) Prior Publication Data

US 2022/0239796 A1 Jul. 28, 2022

(30) Foreign Application Priority Data

Jan. 25, 2021 (JP) .................................. 2021-009563

(51) Int. Cl.
*H04N 1/00* (2006.01)

(52) U.S. Cl.
CPC .............................. *H04N 1/00896* (2013.01)

(58) Field of Classification Search
None
See application file for complete search history.

(56) References Cited

U.S. PATENT DOCUMENTS

| | | | | |
|---|---|---|---|---|
| 2009/0310170 A1* | 12/2009 | Murakami | ......... | H04N 1/00885 358/1.15 |
| 2010/0161819 A1* | 6/2010 | Ohara | ................... | G06F 3/1221 709/229 |
| 2011/0058214 A1* | 3/2011 | Park | ...................... | G06F 1/3215 358/1.15 |

FOREIGN PATENT DOCUMENTS

JP 2013-172509 A 9/2013

* cited by examiner

*Primary Examiner* — Eric A. Rust
(74) *Attorney, Agent, or Firm* — VENABLE LLP (57) ABSTRACT

According to one aspect of the present disclosure, an electronic device is configured to take multiple power states including first and second power states, the electronic device comprising: a first controller controlling a power state of the electronic device; and a second controller connected to the first controller via a serial communication line and a single signal line, wherein the first controller controls the power state of the electronic device into: the first power state in response to a first command being input via the serial communication line; the second power state in response to a second command being input via the serial communication line; the first power state in response to a first pattern signal being input from the signal line; and the second power state in response to a second pattern signal being input from the signal line.

11 Claims, 7 Drawing Sheets

| STATE INSTRUCTION | Telps | min~max |
|---|---|---|
| FIRST POWER SAVING | 500 | 450<Telps≦550 |
| REBOOT | 1000 | 950<Telps≦1050 |
| POWER OFF | 1500 | 1450<Telps≦1550 |

| STATE INSTRUCTION | Tshutdown | min~max |
|---|---|---|
| FORCED POWER OFF | 2000 | - |

POWER INSTRUCTION SIGNAL 310S

FIG. 7

CONTROLLING POWER STATES OF AN IMAGE FORMING APPARATUS

BACKGROUND OF THE INVENTION

Field of the Invention

The present invention relates to an electronic device such as image forming apparatus.

Description of the Related Art

Electronic devices such as an image forming apparatus generally have a plurality of power states such as a sleep state (power saving state) for reducing power consumption during standby, a restart state applied during system update or the like in addition to power states of power OFF or power ON of the apparatus.

Further, there are widely used configurations in which the master side, which manages the system state, instructs a slave side, which manages devices such as a power source or an actuator, to enter a next power state via serial communication. Further, it is common as well to use a hard signal as a timing signal together with serial communication.

In such a case where the master side instructs the slave side to enter some power state via serial communication, it is possible to easily increase choices of instruction details by defining instructions of multiple power states as parameters included in a packet. In a case of serial communication, however, a state instruction may be unable to be suitably provided, for example, when a communication error occurs due to noise or the like. For example, there may be such a case that, even when an instruction for restart is supposed to be provided, the power is turned off due to a process in case of an anomaly because the instruction is unable to be provided via serial communication.

Japanese Patent Application Laid-Open No. 2013-172509 proposes a method of using a combination of a plurality of hard signals as a scheme to switch a plurality of power states even in a case of an anomaly. In Japanese Patent Application Laid-Open No. 2013-172509, the method employs a reset signal used for resetting a drive circuit unit and different control signals used for switching the state even when the reset signal is supplied, and thus may reliably switch the power state even when an anomaly occurs in the drive circuit unit for a hard signal.

When the configuration as described above that provides a notification of the power state by using serial communication or the like is employed, it is desirable that the power state of an apparatus can be suitably switched even when a communication anomaly or the like occur. For example, even when a communication anomaly or the like occur, it is desirable to switch the power state after completion of a preparation process or the like in accordance with a power state to be applied. To realize this, one of the conceivable configurations may be to use control signals via a plurality of signal lines as with Japanese Patent Application Laid-Open No. 2013-172509.

When the configuration to use control signals via a plurality of signal lines is employed as with Japanese Patent Application Laid-Open No. 2013-172509, however, the number of required signal lines increases as the number of states to be controlled increases. In such a conventional technology, there is a problem of increased size and cost of a control circuit board or the like.

SUMMARY OF THE INVENTION

One object of the present invention is to provide a mechanism that can reliably switch a power state with a simple and inexpensive configuration.

Another object of the present invention is to provide an electronic device configured to take multiple power states including first and second power states, the electronic device comprising: a first controller controlling a power state of the electronic device; and a second controller connected to the first controller via a serial communication line and a single signal line, wherein the first controller controls the power state of the electronic device into: the first power state in response to a first command being input via the serial communication line; the second power state in response to a second command being input via the serial communication line; the first power state in response to a first pattern signal being input from the signal line; and the second power state in response to a second pattern signal being input from the signal line.

Further features of the present invention will become apparent from the following description of exemplary embodiments with reference to the attached drawings.

DESCRIPTION OF THE EMBODIMENTS

Embodiments of the present invention will be described below with reference to the drawings.

First Embodiment

Figure 1:
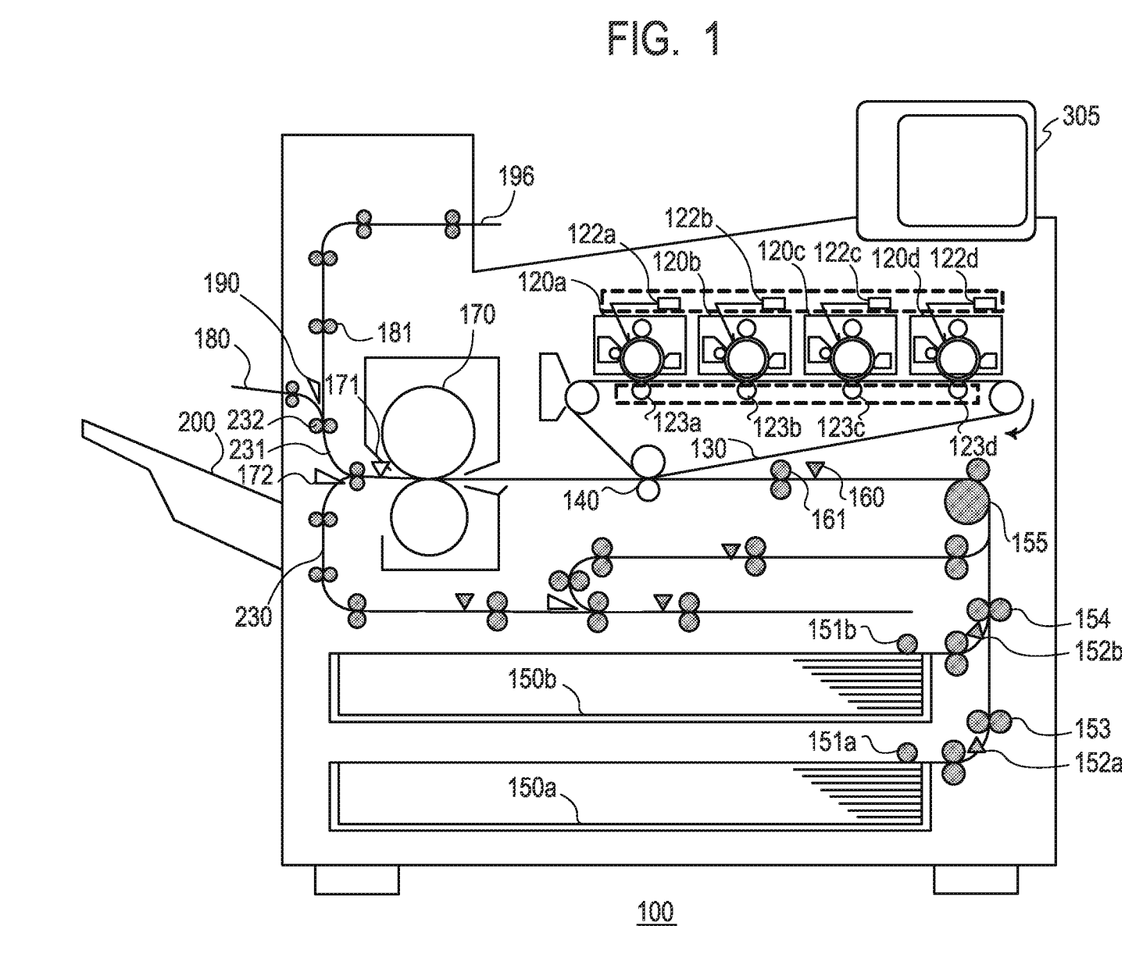
FIG. 1 a sectional view illustrating an example of a configuration of an image forming apparatus of the present embodiment.

FIG. 1 is a sectional view illustrating an example of a configuration of an image forming apparatus 100 illustrating one embodiment of an electronic device of the present invention.

Figure 2:
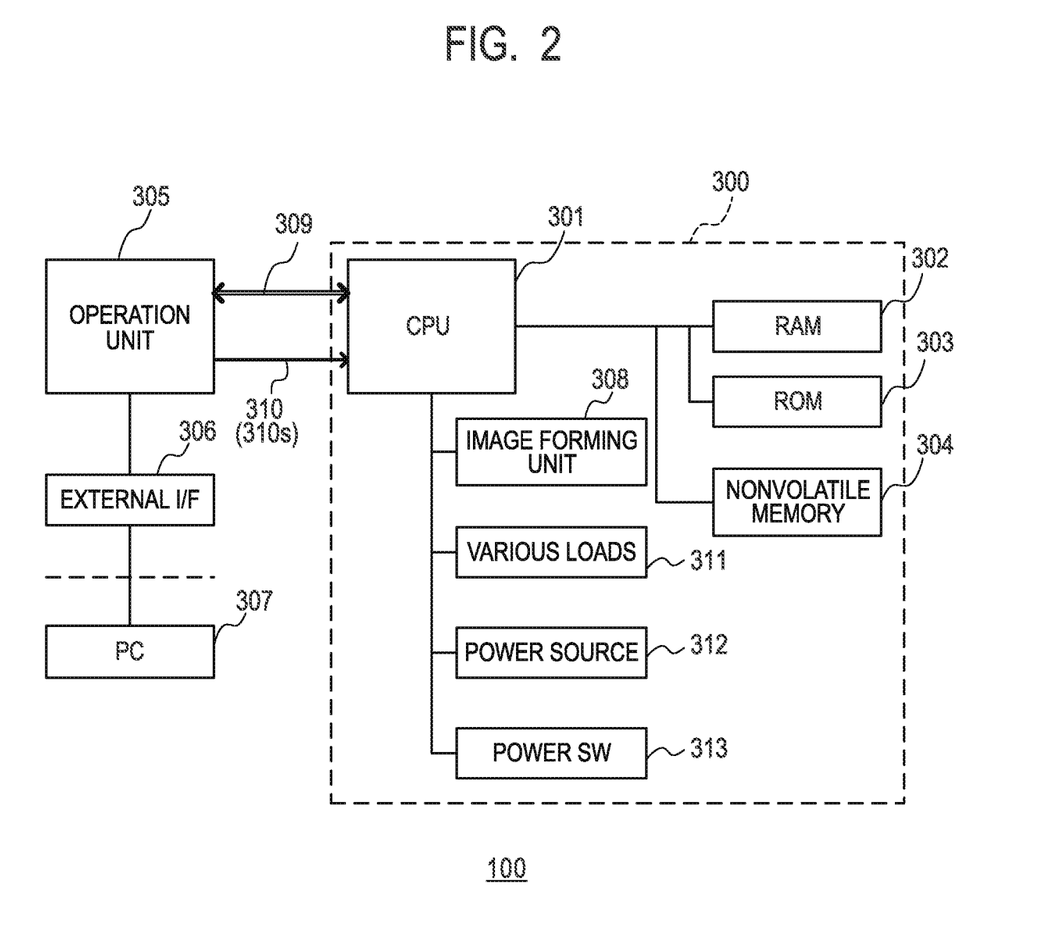
FIG. 2 is a control block diagram illustrating an example of the configuration of the image forming apparatus of the present embodiment.

FIG. 2 is a control block diagram illustrating an example of the configuration of the image forming apparatus 100 illustrating one embodiment of the present invention. The basic configuration will be described below with reference to FIG. 1 and FIG. 2.

A control unit 300 illustrated in FIG. 2 has a CPU 301, a RAM 302, a ROM 303, and a nonvolatile memory 304.

The CPU 301 is connected to an operation unit 305 including a touch panel as an instruction/display unit via a serial communication line 309 and a power instruction signal line 310. A user may request the CPU 301 to perform a desired operation such as execution of a print job, an operation of a power source 312, or the like via the operation unit 305. The operation unit 305 functions as an instruction unit that can provide the CPU 301 with (multiple types of) power instructions used for switching the power state of the image forming apparatus 100. The CPU 301 operates to switch the power state of the image forming apparatus 100 in accordance with the power instruction provided from the operation unit 305. Note that the power instruction signal line 310 is formed of a single signal line.

The operation unit 305 outputs a power instruction signal 310s to the power instruction signal line 310. The operation unit 305 changes the logic (logic value (level)) of the power instruction signal 310s based on a predefined pattern for each of multiple types of power instructions (the details thereof will be described later).

Further, a PC 307 can be connected to the CPU 301 via an external I/F 306 that is an interface with an external device connected to the operation unit 305.

The CPU 301 starts operation in response to receiving an instruction to start a print operation or an instruction for an operation to recover from a sleep mode (power saving state) or the like from the operation unit 305 or the PC 307. For example, once the user provides an instruction to start a print operation from the PC 307, the CPU 301 performs drive control of an image forming unit 308 or various loads 311 formed of a motor, a heater, or the like connected thereto.

Further, the CPU 301 is configured to be able to control the image forming unit 308 as described above. The image forming unit 308 can control high-voltage drive of cartridges 120a, 120b, 120c, and 120d containing photoconductor, an intermediate transfer belt 130, primary transfer units 123a to 123d, a secondary transfer unit 140, and the like and control laser scanners 122a to 122d.

In the ROM 303, a procedure of image forming, a procedure of a flowchart used in description provided later, or the like are stored as a program or the like.

The nonvolatile memory 304 can hold data even after power supply to the CPU 301 is stopped. The nonvolatile memory 304 stores data or the like continued to be used also after power OFF or ON out of data stored in the RAM 302.

A power SW 313 is used for powering on or off the apparatus by a user operation. The CPU 301 monitors the state of the power SW 313 and operates the power source 312 in accordance with the state of the power SW 313.

<Basic Image Forming Operation>

A basic image forming operation will be described with reference to FIG. 1 and FIG. 2.

Once the user executes a print job from the PC 307 connected to the external I/F 306 and the CPU 301 is notified of an instruction to start a print operation, the CPU 301 starts a sheet feed operation to feed sheets from a sheet feed cassette 150a, 150b, or the like. In such a sheet feed operation, sheet feed pickup rollers 151a and 151b are operated and rotated when conveyance motors that are the drive sources of the sheet feed pickup rollers 151a and 151b are driven, and sheets in the sheet feed cassette 150a or 150b are fed and conveyed one by one. In such an operation, the CPU 301 uses sheet feed pickup sensors 152a and 152b to monitor whether or not the sheet feed operation to feed sheets has been normally performed.

Furthermore, the CPU 301 starts the image forming operation by using the cartridges 120a, 120b, 120c and 120d so that the operation is ready before the time a sheet reaches the secondary transfer unit 140. In such an image forming operation, a toner image is formed on the intermediate transfer belt 130 by the primary transfer units 123a to 123d.

The cartridge 120a is a cartridge used for forming a yellow (hereafter, which may be referred to as "Y") image. The cartridge 120b is a cartridge used for forming a magenta (hereafter, which may be referred to as "M") image. The cartridge 120c is a cartridge used for forming a cyan (hereafter, which may be referred to as "C") image. The cartridge 120d is a cartridge used for forming a black (hereafter, which may be referred to as "K") image. The cartridges 120a, 120b, 120c, and 120d are configured to be user-attachable and detachable.

Sheets fed from the sheet feed cassette 150a and the sheet feed cassette 150b by the sheet feed operation are conveyed to downstream of the image forming apparatus by conveyance path rollers 153, 154, and 155. The CPU 301 detects the position of a conveyed sheet by monitoring output of a pre-registration conveyance sensor 160. The CPU 301 then controls conveyance of a sheet so that the leading end of the sheet and the leading end of a toner image on the intermediate transfer belt 130 are matched at the secondary transfer unit 140 taking into consideration of the timing that the leading end of the sheet reaches the pre-registration conveyance sensor 160. In such a control, for example, if it is determined that the sheet reaches the secondary transfer unit 140 earlier than the toner image, the sheet is stopped by the registration roller 161 for a predetermined period, and conveyance of the sheet is then restarted to match the leading end of the sheet to the leading end of the toner image.

In such a way, a secondary transfer voltage is applied to the sheet and the toner image that have reached the secondary transfer unit 140, and thereby the toner image is transferred on the sheet.

The sheet on which secondary transfer has been applied is conveyed to a fixer 170, the toner image is heated and fixed on the sheet by the fixer 170, and the sheet is then further conveyed to downstream of the image forming apparatus.

After the leading end of the sheet on which the toner image has been fixed reaches the sheet conveyance sensor 171, the CPU 301 determines whether to convey the sheet to a sheet conveyance path 230 or a sheet conveyance path 231 in accordance with an instruction specified by the PC 307 connected via the operation unit 305 or the external I/F 306 in advance. In such an operation, the CPU 301 switches the operation of a conveyance flapper 172 in accordance with the determination and thereby switches the path to which a sheet is to be conveyed. Specifically, the conveyance flapper 172 is switched such that a sheet is conveyed to the sheet conveyance path 230 when the image forming operation corresponds to printing on the front side for a double-sided print instruction, while a sheet is conveyed to the sheet conveyance path 231 when the image forming operation corresponds to printing on the back side for a single-sided print instruction or a double-sided print instruction.

A case where a sheet is conveyed to the sheet conveyance path 231 will be described below.

A sheet conveyed to the sheet conveyance path 231 is further conveyed to downstream of the image forming apparatus from the conveyance roller 232. Also in such an operation, the CPU 301 switches the operation of the sheet conveyance flapper 190 in accordance with an instruction specified by the PC 307 connected via the operation unit 305 or the external I/F 306 in advance in the same manner as the switching described above. This enables a configuration that can switch whether a sheet is conveyed to a sheet conveyance path 180 side or a sheet conveyance path 181 side.

When the tray specified for sheet discharge by the user is a sheet discharge tray 200, a sheet is conveyed to the sheet conveyance path 180 side, and when the tray specified for sheet discharge is a sheet discharge tray 196, a sheet is conveyed to the sheet conveyance path 181 side.

Note that the basic image forming operation described above is an example, and the present invention is not limited to the configuration described above.

<Power States>

Next, power supply states of each unit in accordance with the power state of the image forming apparatus will be described with reference to FIG. 3A and FIG. 3B.

Figure 3A:
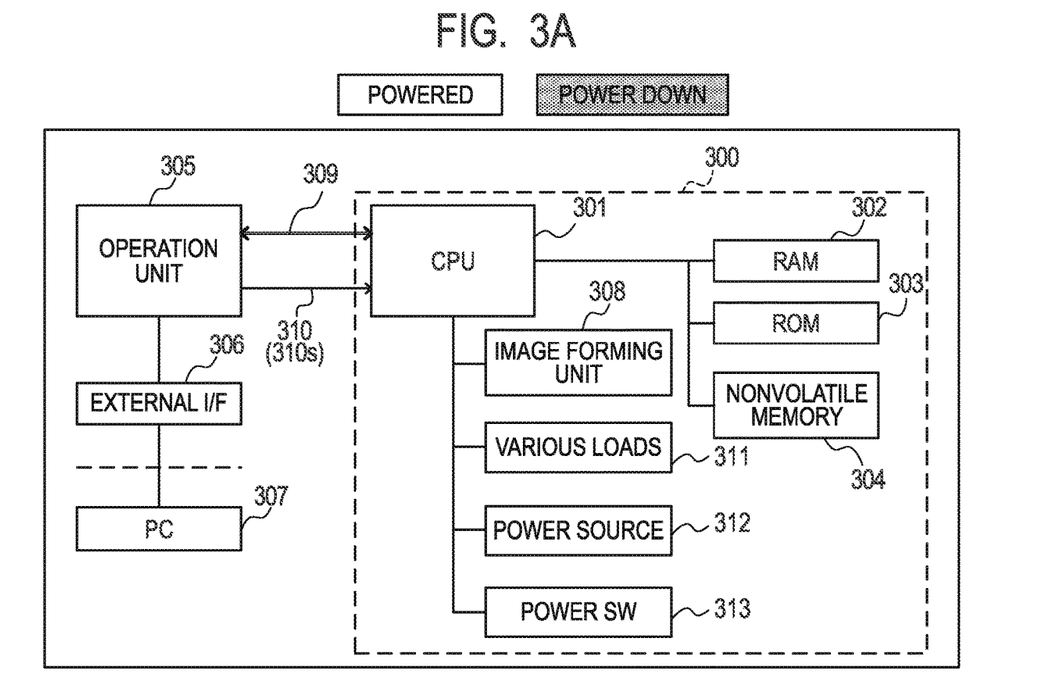
FIG. 3A and FIG. 3B are diagrams illustrating an example of a power state of the image forming apparatus of the present embodiment.
Figure 3B:
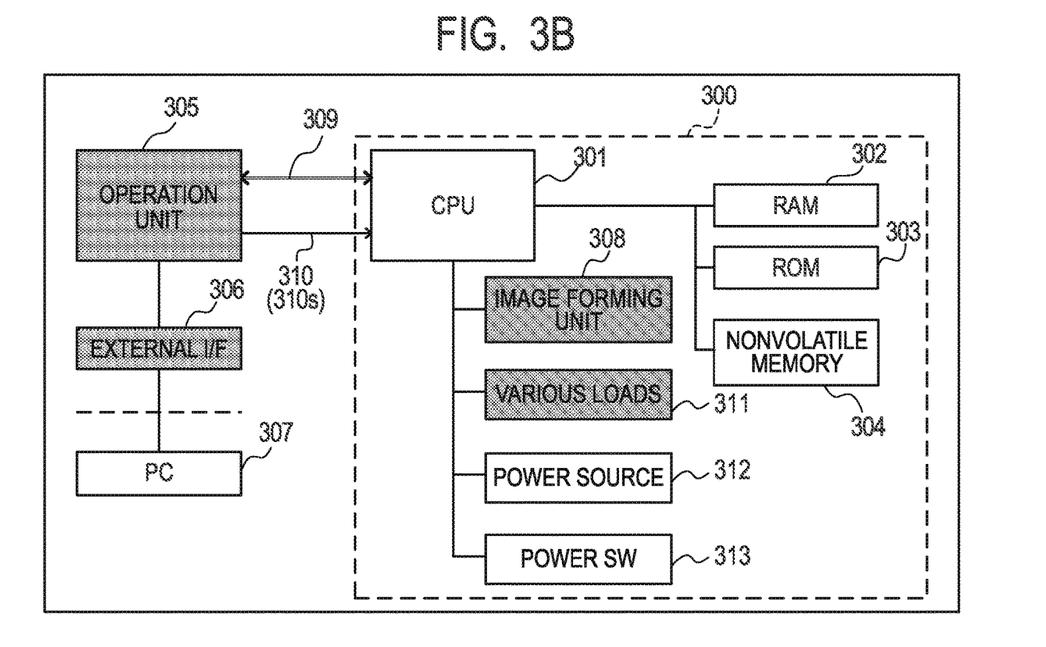

FIG. 3A and FIG. 3B are diagrams illustrating an example of power states of the image forming apparatus of the present embodiment.

FIG. 3A illustrates a standby state of the apparatus.

Further, FIG. 3B illustrates a power OFF state.

The standby state (a) is a state where power is supplied to all the units including the operation unit 305 and the external I/F 306 in addition to the control unit 300.

The power OFF state (b) is a state where power is supplied to only the least units such as the CPU 301, the RAM 302, the ROM 303, and the nonvolatile memory 304 required for performing startup determination. In the power OFF state (b), none of the image forming unit 308, the various loads 311, the operation unit 305, nor the external I/F 306 is supplied with power.

For example, when the operation unit 305 provides an instruction for power OFF during standby of the apparatus or when it is detected that the power SW 313 has entered an OFF state by a user operation, the state of the apparatus transitions from the standby state (a) to the power OFF state (b). Note that, in response to entry to an ON state of the power SW 313 via a user operation being detected in the power OFF state (b), the state of the apparatus transitions from the power OFF state (b) to the standby state (a).

Further, when the operation unit 305 provides an instruction for restart (reboot) during the standby of the apparatus, the state of the apparatus transitions from the standby state (a) to the power OFF state (b) and then recovers to the standby state (a).

Note that the power supply state of the unit in the power state described above is an example, and the present invention is not limited to the configuration described above. For example, multiple stages of power saving states or the like may be provided between the standby state (a) and the power OFF state (b). In the present embodiment, a first power saving state where the power consumption is smaller than in the standby state (a) and larger than in the power OFF state (b), a second power saving state where the power consumption is smaller than in the first power saving state and larger than in the power OFF state (b), and the like are provided. For example, the first power saving state corresponds to a power state where the backlight of the display of the operation unit 305 is turned off from the standby state (a).

Further, the second power saving state corresponds to a power state where the operation clock of the CPU 301 is further reduced from the first power saving state.

<Overview of Control>

Figure 4:
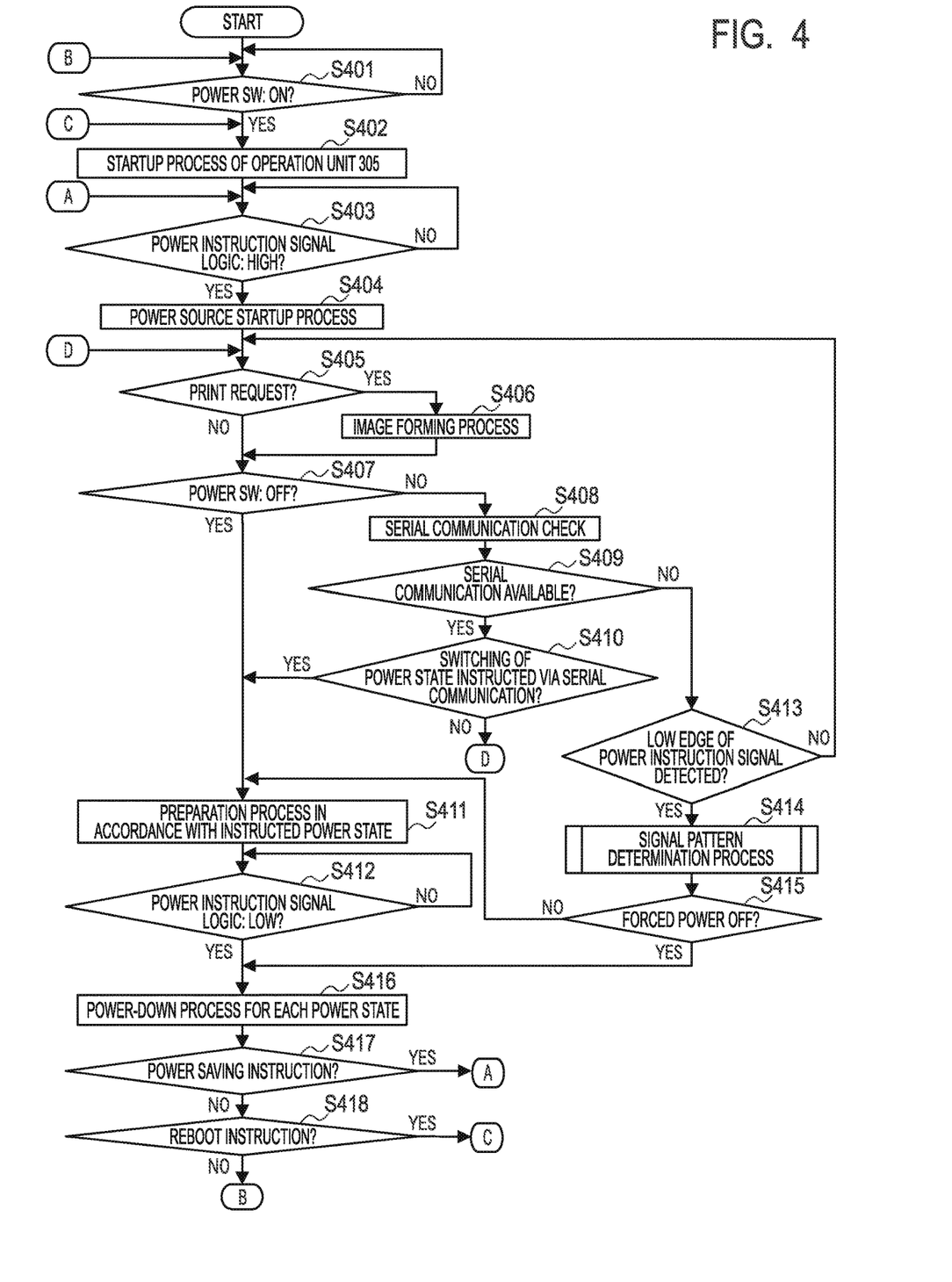
FIG. 4 is a flowchart illustrating an example of a process performed by a CPU in the image forming apparatus of a first embodiment.

FIG. 4 is a flowchart illustrating an example of a process of the CPU 301 in the image forming apparatus of the first embodiment. The procedures of processes illustrated in flowcharts of FIG. 4 and FIG. 5 described later are stored in the ROM 303 as programs and performed when the CPU 301 loads and executes the programs.

Once powered on and starting processing, the CPU 301 monitors whether or not the power SW 313 is ON and, if not, continues the monitoring until the power SW 313 is ON (S401). If the CPU 301 confirms that the power SW 313 is ON (S401, Yes), the CPU 301 first performs a startup process on the operation unit 305 to start powering to the operation unit 305 (S402).

After completion of the startup process on the operation unit 305, the logic (logic value (level)) of the power instruction signal 310s input to the CPU 301 from the operation unit 305 via the power instruction signal line 310 is switched to "High". Thus, the CPU 301 monitors the logic of the power instruction signal 310s during a period until the logic of the power instruction signal 310s is switched to "High" (S403). If the CPU 301 determines that the logic of the power instruction signal 310s is "High" (S403, Yes), the CPU 301 proceeds with the process to S404.

In S404, the CPU 301 performs a power source startup process that is a process to supply power to all the modules that can be supplied with power and controls the state of the apparatus to transition to the standby state illustrated in FIG. 3A.

The CPU 301 then monitors whether or not there is a print request from the operation unit 305 (S405). If there is a print request from the operation unit 305 (S405, Yes), the CPU 301 proceeds with the process to S406. In S406, the CPU 301 performs the image forming process and proceeds with the process to S407.

In contrast, if the CPU 301 determines that there is no print request (S405, No), the CPU 301 proceeds with the process to S407.

In S407, the CPU 301 checks whether or not the state of the power SW 313 is OFF. If the state of the power SW 313 is OFF (S407, Yes), the CPU 301 proceeds with the process to S411. The process of S411 and the subsequent steps will be described later.

In contrast, if the CPU 301 determines that the state of the power SW 313 is not OFF (S407, No), the CPU 301 proceeds with the process to S408.

In S408, the CPU 301 checks whether or not serial communication via the serial communication line 309 (hereafter, simply referred to as "serial communication") is available. The checking method in S408 may be any method, for example, a method of transmitting and receiving a predetermined packet and confirming that no error occurs, a method of confirming that communication via serial communication within a predetermined period has been performed without occurrence of an error, or the like.

Next, the CPU 301 checks a result of the serial communication check in S408 described above and determines whether or not serial communication is available (S409).

First, the operation performed when it is determined in above S409 that serial communication is available will be described.

If serial communication is available (S409, Yes), the CPU 301 proceeds with the process to S410.

In S410, the CPU 301 checks whether or not there is an instruction for switching of the power state via serial communication. If the CPU 301 determines that there is no instruction for switching the power state (S410, No), the CPU 301 returns the process to S405 and continues the process.

In contrast, if reception of an instruction for switching the power state is confirmed in S410 (S410, Yes), the CPU 301 proceeds with the process to S411.

In S411, the CPU 301 performs a preparation process in accordance with the power state instructed by serial communication. The preparation process in S411 refers to a process to stop the various loads 311 such as an actuator, a process to save data into the nonvolatile memory 304, a process to disconnect serial communication, a process to save internal data of the operation unit 305 (not illustrated), or the like, for example. Note that, upon completion of power-down preparation of the operation unit 305, the operation unit 305 switches the logic of the power instruction signal 310s to "Low".

Thus, in S412, the CPU 301 monitors the power instruction signal 310s and waits for the logic of the power instruction signal 310s to be switched to "Low" (S412).

If the CPU 301 confirms that the logic of the power instruction signal 310s is "Low" (S412, Yes), the CPU 301 proceeds with the process to S416.

In S416, the CPU 301 performs a power-down process that is a process for stopping power supply to the target module in accordance with a power state instructed via the serial communication described above. If the instruction in the serial communication described above is an instruction for power OFF, the state of the apparatus transitions to the power OFF state illustrated in FIG. 3B in accordance with the power-down process of S416. Further, if the instruction in the serial communication described above is an instruction for power saving, the state of the apparatus transitions to a power saving state (not illustrated) in accordance with the power-down process of S416. For example, the first power saving state where the backlight of the display of the operation unit 305 is turned off or the second power saving state where the operation clock of the CPU 301 is reduced from the first power saving state is applied, and thereby the state transitions to a state where the power consumption of the apparatus is reduced (not illustrated).

Further, in contrast, if the CPU 301 determines in S409 described above that serial communication is unavailable (S409, No), the CPU 301 proceeds with the process to S413.

In S413, the CPU 301 checks whether or not a "Low" edge of the logic of the power instruction signal 310s is detected in order to determine whether or not there is an instruction for the power state via the power instruction signal 310s. If the "Low" edge of the logic of the power instruction signal 310s is not detected (S413, No), the CPU 301 returns the process to S405 and continues the process.

In contrast, if the "Low" edge of the logic of the power instruction signal 310s is detected (S413, Yes), the CPU 301 proceeds with the process to S414.

In S414, the CPU 301 performs a signal pattern determination process based on the detection period of the "Low" state of the power instruction signal and proceeds with the process to S415. The signal pattern determination process will be described later with reference to FIG. 5.

In S415, the CPU 301 checks whether or not the result of the signal pattern determination in S414 described above indicates determination of forced power OFF. If an instruction other than the forced power OFF (first power saving state, reboot, or power OFF) is determined (S415, No), the process proceeds to S411.

In contrast, if the CPU 301 determines that the result of the signal pattern determination in S414 described above is the forced power OFF (S415, Yes), the CPU 301 proceeds with the process to S416 and performs the power-down process.

After performing the power-down process in S416 described above, the CPU 301 first checks whether or not the instruction from the operation unit 305 is an instruction for power saving (S417). If the instruction is an instruction for power saving (S417, Yes), the CPU 301 returns the process to S403 and waits for the operation unit 305 to change the logic of the power instruction signal to "High".

In contrast, if the instruction from the operation unit 305 is not an instruction for power saving (S417, No), the CPU 301 proceeds with the process to S418.

In S418, the CPU 301 checks whether or not the instruction from the operation unit 305 is an instruction for reboot (restart). If the instruction is an instruction for reboot (S418, Yes), the CPU 301 returns the process to S402 and starts restart of the power source.

In contrast, if the instruction is not an instruction for reboot (S418, No), the CPU 301 returns the process to S401 and waits for the power SW 313 to be ON as a startup instruction from the next user operation.

The above is description of the overview of the control in the present embodiment.

<Signal Pattern Determination Process (S414)>

Figure 5:
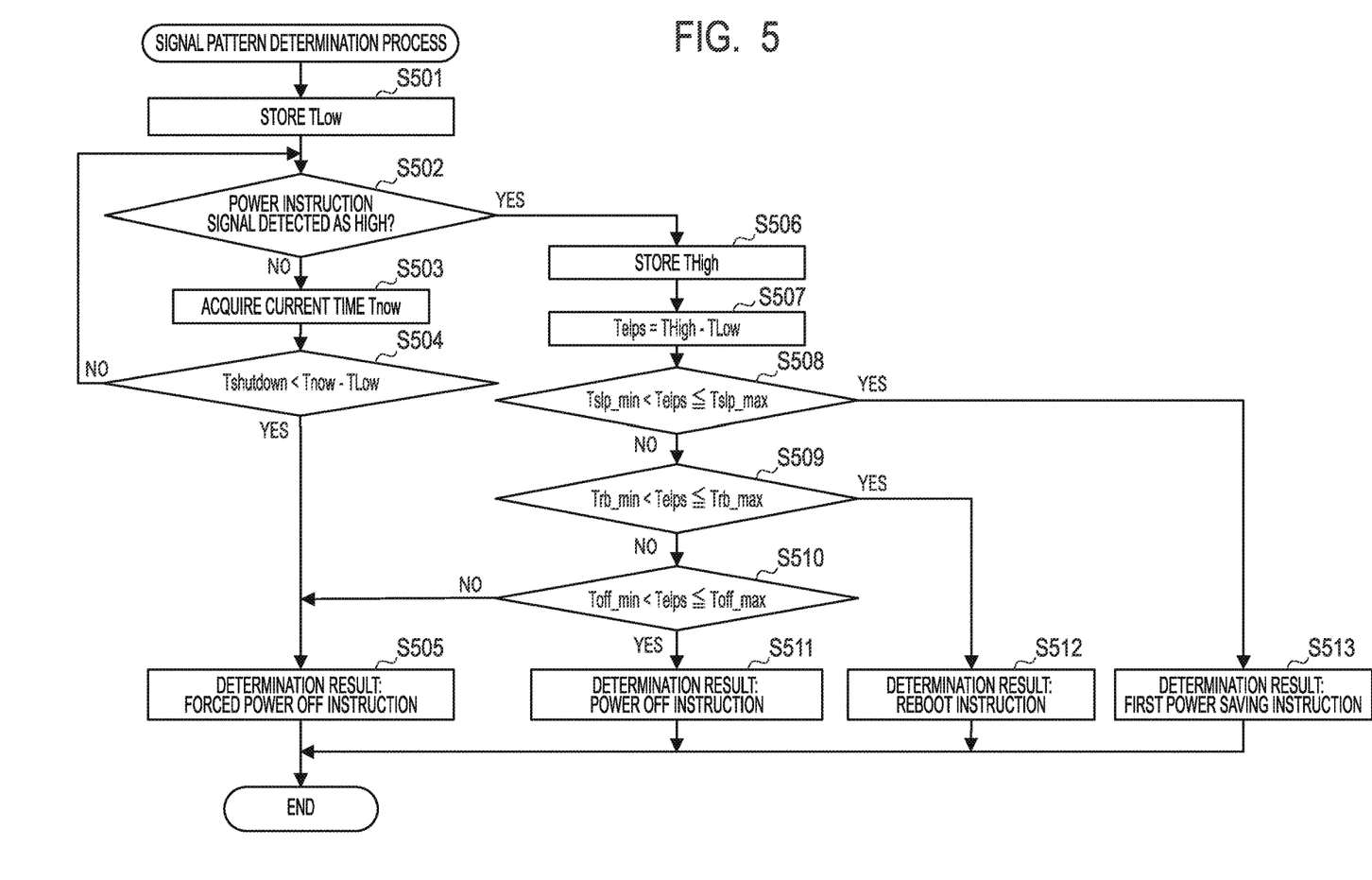
FIG. 5 is a flowchart illustrating an example of a signal pattern determination process of a power instruction signal.

FIG. 5 is a flowchart illustrating an example of the signal pattern determination process of the power instruction signal 310s. Note that this flowchart illustrates an internal process of the process illustrated in S414 of FIG. 4.

In addition, although the process to determine a signal pattern based on the detection period of the "Low" state of the power instruction signal 310s is illustrated here as an example, the embodiment is not limited thereto. Further, the definition of signal patterns of the power instruction signal 310s will be described later with reference to FIG. 6.

Once starting a process, the CPU 301 stores the current time $T_{Low}$ at which "Low" of the power instruction signal 310s is detected and which serves as a start point of the signal pattern determination (S501).

Furthermore, the CPU 301 checks whether or not transition of the logic of the power instruction signal 310s to a "High" state indicating the end of signal pattern determination is detected (S502).

First, a case where the logic of the power instruction signal is in a "Low" state in S502 will be described. Herein, the logic of the power instruction signal 310s being in a "Low" state means that the "Low" state is still continued for forming a signal pattern (that a "High" state has not yet been detected).

If the logic of the power instruction signal 310s is the "Low" state (S502, No), the CPU 301 acquires $T_{now}$ that is the current time (S503).

Next, the CPU 301 determines whether or not the elapsed time from $T_{Low}$ to $T_{now}$, ($T_{now}-T_{Low}$), reaches a threshold $T_{shutdown}$ indicating a forced power OFF instruction (S504). If the CPU 301 determines that the elapsed time is less than or equal to $T_{shutdown}$ (S504, No), the CPU 301 returns the process to S502 and continues the process.

In contrast, if the CPU 301 determines that the elapsed time exceeds $T_{shutdown}$, the CPU 301 proceeds with the process to S505.

In S505, the CPU 301 determines that the result of the signal pattern determination of the power instruction signal is a "forced power OFF" instruction and ends the signal pattern determination process.

A case where the logic of the power instruction signal is in a "High" state in S502 described above will now be described. Here, the logic of the power instruction signal 310s being in a "High" state means that the signal pattern was finally determined.

If the logic of the power instruction signal 310s is in the "High" state (S502, Yes), the CPU 301 proceeds with the process to S506.

In S506, the CPU 301 stores the time $T_{High}$ the "High" of the power instruction signal 310s was detected.

Furthermore, the CPU 301 calculates $T_{elps}$ representing the difference between $T_{High}$ and $T_{Low}$, ($T_{High}-T_{Low}$), in accordance with the following Equation (1) (S507).

$$T_{elps}=T_{High}-T_{Low} \quad (1)$$

Next, the CPU 301 checks whether or not $T_{elps}$ is in a period between $T_{slp\_min}$ (exclusive) and $T_{slp\_max}$ (inclusive) ($T_{slp\_min}<T_{elps}\leq T_{slp\_max}$) by which the instruction is determined as the "first power saving" instruction based on the calculation result in S507 described above (S508). If $T_{elps}$ is between $T_{slp\_min}$ (exclusive) and $T_{slp\_max}$ (inclusive) (S508, Yes), the CPU 301 proceeds with the process to S513. In S513, the CPU 301 determines that the instruction of the power state from the operation unit 305 is the "first power saving" instruction (an instruction for switching the state to the first power saving state) and ends the signal pattern determination process.

In contrast, if $T_{elps}$ is not between $T_{slp\_min}$ and $T_{slp\_max}$ (S508, No), the CPU 301 proceeds with the process to S509.

In S509, the CPU 301 checks whether or not $T_{elps}$ is in a period between $T_{rb\_min}$ (exclusive) and $T_{rb\_max}$ (inclusive) ($T_{rb\_min}<T_{elps}\leq T_{rb\_max}$) by which the instruction is determined as the reboot instruction. In this step, if $T_{elps}$ is between $T_{rb\_min}$ (exclusive) and $T_{rb\_max}$ (inclusive) (S509, Yes), the CPU 301 proceeds with the process to S512.

In S512, the CPU 301 determines that the instruction of the power state from the operation unit 305 is the "reboot" instruction and ends the signal pattern determination process.

In contrast, if $T_{elps}$ is not between $T_{rb\_min}$ and $T_{rb\_max}$ (S509, No), the CPU 301 proceeds with the process to S510.

In S510, the CPU 301 checks whether or not $T_{elps}$ is in a period between $T_{off\_min}$ (exclusive) and $T_{off\_max}$ (inclusive) ($T_{off\_min}<T_{elps}\leq T_{off\_max}$) by which the instruction is determined as the power OFF instruction. If $T_{elps}$ is between $T_{off\_min}$ (exclusive) and $T_{off\_max}$ (inclusive) (S510, Yes), the CPU 301 proceeds with the process to S511.

In S511, the CPU 301 determines that the instruction of the power state from the operation unit 305 is the "power OFF" instruction and ends the signal pattern determination process.

In contrast, if $T_{elps}$ is not between $T_{off\_min}$ and $T_{off\_max}$ (S510, No), the CPU 301 proceeds with the process to S505. In this case, the CPU 301 determines that the power instruction is the "forced power OFF" instruction for a protection process because of not notified of the expected pattern and ends the signal pattern determination process.

Note that, although the "first power saving" instruction, the "power OFF" instruction, the "reboot" instruction, and the "forced power OFF" instruction have been described in this flowchart as signal patterns to be determined, patterns to be determined are not limited thereto. For example, a determination pattern of the "second power saving" instruction (the instruction for switching the state to the second power saving state) or the like in the present embodiment may be included.

Further, although it has been described in the present embodiment that a signal pattern is defined by the elapsed time of the "Low" logic of the power instruction signal 310s, the embodiment is not limited thereto. For example, a power instruction may be determined based on the number of times of toggle of a power instruction signal (the number of times that the power instruction signal is switched between Low and High).

The above is description of the signal pattern determination process.

<Definition Example of Signal Pattern>

Figure 6:
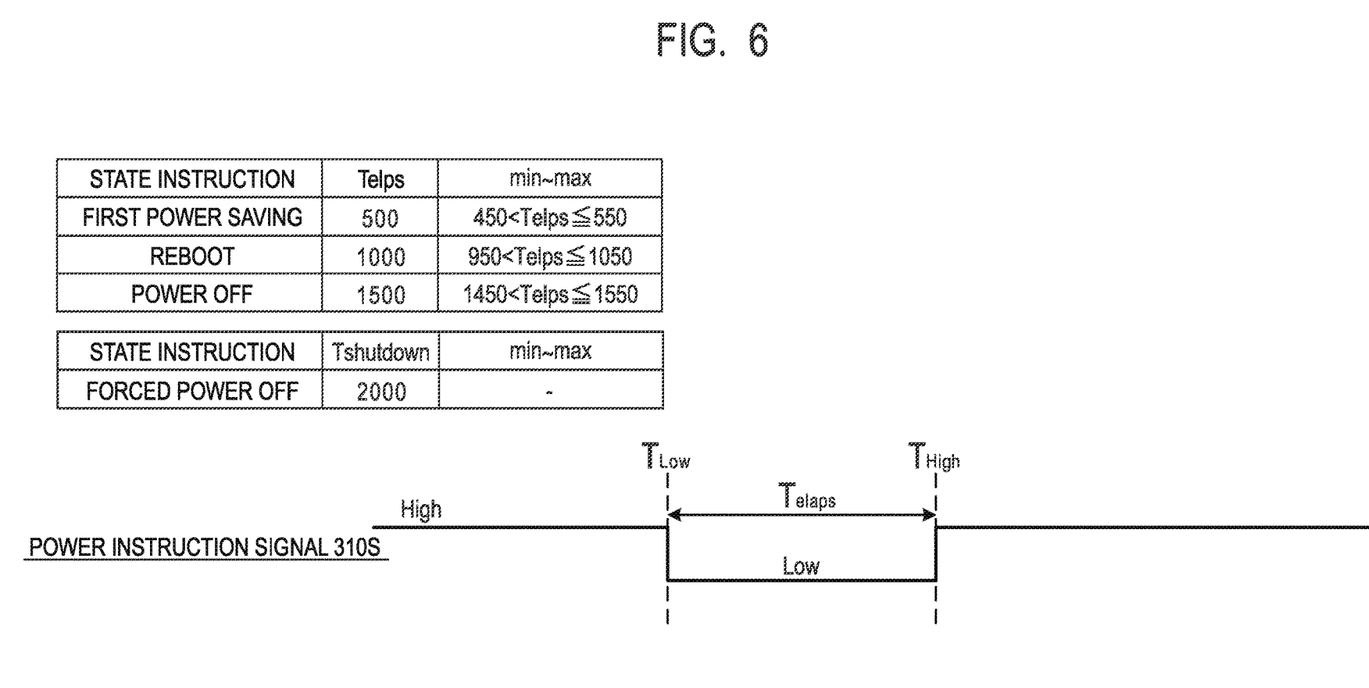
FIG. 6 is a diagram illustrating a definition example of signal patterns of the power instruction signal.

FIG. 6 is a diagram illustrating a definition example of a signal pattern of the power instruction signal 310s in the present embodiment.

As illustrated in FIG. 6, the time $T_{elps}$ required for signal pattern determination is represented by the elapsed time from $T_{Low}$, which is the time the logic of the power instruction signal 310s changes to "Low", to $T_{High}$, which is the time the logic of the power instruction signal 310s changes to "High".

Further, in this example, four patterns of "first power saving state", "reboot (restart)", "power OFF", and "forced power OFF" are defined as the signal patterns.

In this example, first, 500 ms is defined as $T_{elps}$ used for determining the "first power saving state", 450 ms is defined as a value corresponding to $T_{slp\_min}$ illustrated in S508 of FIG. 5, and 550 ms is defined as a value corresponding to $T_{slp\_max}$ illustrated in S508 of FIG. 5. That is, according to the present definition example, if the period during which the logic of the power instruction signal 310s is "Low" exceeds 450 ms and is less than or equal to 550 ms, the CPU 301 determines that the power instruction from the operation unit 305 is the "first power saving" instruction.

Next, 1000 ms is defined as $T_{elps}$ used for determining the "reboot", 950 ms is defined as a value corresponding to $T_{rb\_min}$ illustrated in S509 of FIG. 5, and 1050 ms is defined as a value corresponding to $T_{rb\_max}$ illustrated in S509 of FIG. 5. That is, according to the present definition example, if the period during which the logic of the power instruction signal 310s is "Low" exceeds 950 ms and is less than or equal to 1050 ms, the CPU 301 determines that the power instruction from the operation unit 305 is the "reboot" instruction.

Further, 1500 ms is defined as $T_{elps}$ used for determining the "power OFF", 1450 ms is defined as a value corresponding to $T_{off\_min}$ illustrated in S510 of FIG. 5, and 1550 ms is defined as a value corresponding to $T_{off\_max}$ illustrated in S510 of FIG. 5. That is, according to the present definition example, if the period during which the logic of the power instruction signal 310s is "Low" exceeds 1450 ms and is less than or equal to 1550 ms, the CPU 301 determines that the power instruction from the operation unit 305 is the "power OFF" instruction.

Finally, 2000 ms is defined as $T_{shutdown}$ used for determining the "forced power OFF" (illustrated in S504 of FIG. 5). That is, if the period during which the logic of the power instruction signal 310s is "Low" exceeds 2000 ms in S504 of FIG. 5, it is determined that the power instruction from the operation unit 305 is the "forced power OFF" instruction. Further, if the signal pattern is not determined as the defined signal patterns (the first power saving state, the reboot, the power OFF) in any of S508, S509, and S510, it is also determined that the power instruction from the operation unit 305 is the "forced power OFF" instruction.

Note that the signal patterns of power instructions and the defined time for each power instruction described in this example are one example, and the embodiment is not limited thereto.

The above is description of the definition example of the signal patterns of the power instruction signal 310s corresponding to instructions for switching the power state of the image forming apparatus 100.

As described above, in the present embodiment, the control unit 300 is instructed for a plurality of power states from the operation unit 305 not only via serial communication but also via the power instruction signal line 310 that is a single signal line, namely, by using each of (both of) them. In this case, the logic of the power instruction signal 310s on the power instruction signal line 310 that is a single signal line is changed based on the predefined pattern by the operation unit 305. The control unit 300 determines the pattern of the signal, and this makes it possible to suitably switch a plurality of power patterns even when it is not possible to provide an instruction via serial communication (when communication is disconnected or the like). Therefore, conventionally, only forced power off may be applied when serial communication is disconnected. According to the present embodiment, however, the power state can be suitably switched even in such a case. Further, with a simple configuration that notifies the control unit 300 of multiple types of power instructions from the operation unit 305 by using signals via the power instruction signal line 310 that is a single signal line, it is possible to prevent an increase in size or cost of the control circuit board or the like. That is, an apparatus that can reliably switch the power state with a simple and inexpensive configuration can be provided.

Second Embodiment

In the configuration of the first embodiment, when no instruction is received via serial communication, the power state is switched in accordance with a signal pattern of the power instruction signal 310s in the same manner as when the instruction via the serial communication is available. In the configuration of the second embodiment, also when an instruction via serial communication is available, the final power mode is switched in accordance with a signal pattern of the subsequent power instruction signal 310s. Such a configuration enables a suitable process even when an instruction for a power state is provided via serial communication and the power state is required to be further changed due to occurrence of an anomaly or the like after the end of the serial communication.

For example, such a situation may occur that the operation unit 305 provides the "first power saving" instruction, an anomaly then occurs in a data saving process inside the operation unit 305 while the CPU 301 is performing a process for power-down including the end of serial communication in S411 of FIG. 4, and switching to power OFF is thus required. In the case of the first embodiment, since the serial signal has already been disconnected in such a situation, it is required to once recover the power state from the "first power saving state" to the "standby state" and newly provide an instruction for "power OFF" via serial communication. On the other hand, in the second embodiment, since an instruction by the power instruction signal 310s can be provided even after disconnection of the serial communication, this enables the power state to be switched without temporarily recovering the power state. The details thereof will be described later.

Control in the Second Embodiment

The control details in the second embodiment will be described with reference to FIG. 7.

Figure 7:
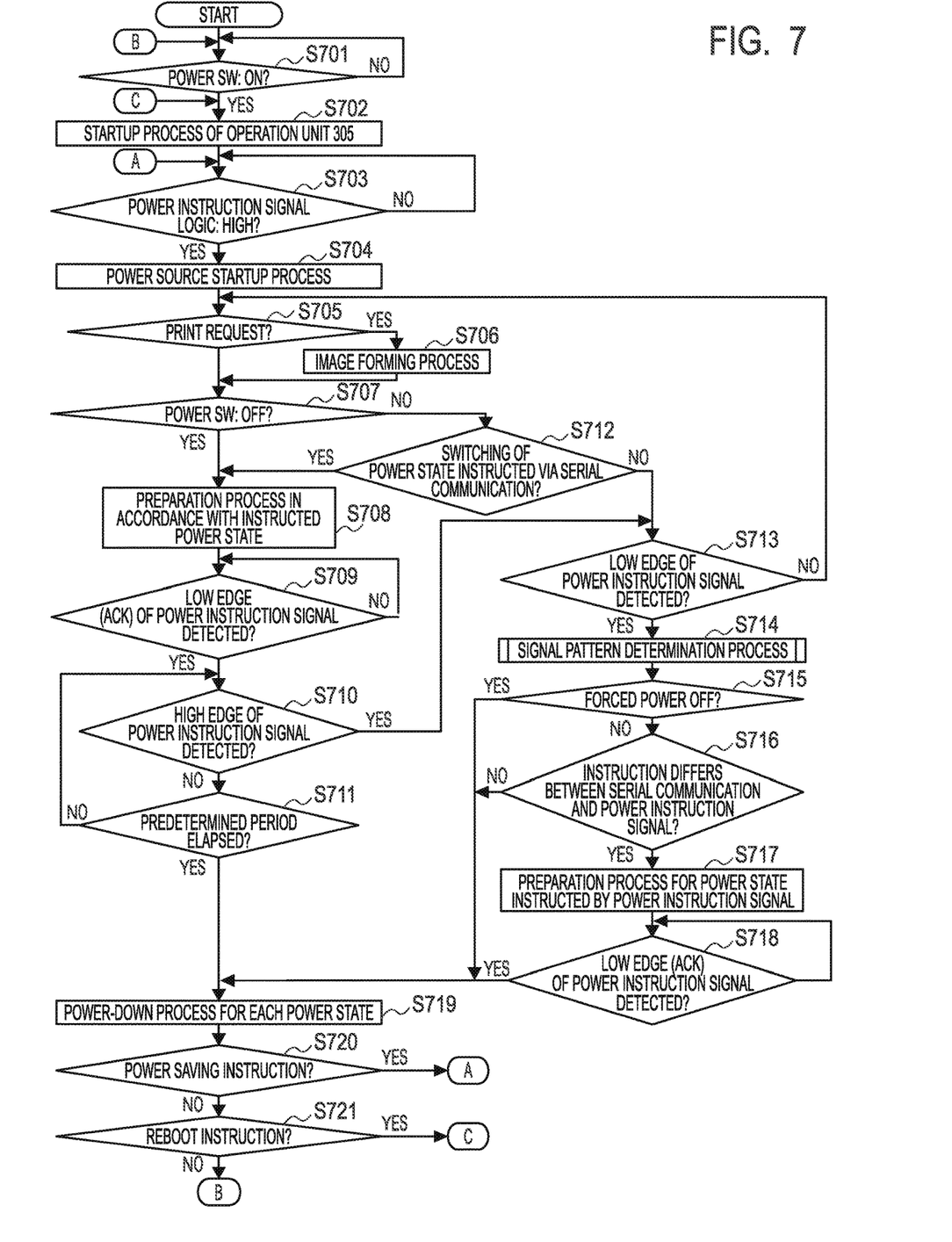
FIG. 7 is a flowchart illustrating an example of a process performed by a CPU in an image forming apparatus of a second embodiment.

FIG. 7 is a flowchart illustrating an example of the process of the CPU 301 in an image forming apparatus of the second embodiment. The procedure of the process illustrated in the flowchart of FIG. 7 is stored in the ROM 303 as a program and implemented when the CPU 301 loads and executes the program. Note that, since S701 to S707 of FIG. 7 are substantially the same as S401 to S407 of FIG. 4 in their control, respectively, and S719 to S721 of FIG. 7 are substantially the same as S416 to S418 of FIG. 4 in their control, respectively, the description thereof will be omitted here.

The process of S707 and the subsequent steps will be described below.

First, a case where the state of the power SW 313 is OFF in S707 will be described.

If the state of the power SW 313 is OFF (S707, Yes), the CPU 301 proceeds with the process to S708.

In S708, the CPU 301 determines that an instruction for transition to the power OFF is provided by a user instruction and performs a preparation process that is substantially the same as S411 of FIG. 4 and in accordance with the instructed power state.

After completion of the preparation process of S708, the CPU 301 checks whether or not the logic of the power instruction signal 310s is in the "Low" state, which means that power-down preparation of the operation unit 305 is completed (S709). The CPU 301 repeats the process of S709 until confirming that the logic of the power instruction signal 310s is "Low".

Then, if the CPU 301 determines that the logic of the power instruction signal 310s is "Low" (S709, Yes), the CPU 301 proceeds with the process to S710.

In S710 and S711, to check whether or not there is a power instruction by the power instruction signal 310s, the CPU 301 monitors for a predetermined period whether or not the logic of the power instruction signal 310s again changes to "High".

Then, if the logic of the power instruction signal 310s changes to "High" within the predetermined period (S710, Yes), the CPU 301 determines to be notified of a power instruction by the power instruction signal 310s and proceeds with the process to S713. The process of S713 will be described later.

If the CPU 301 determines that the logic of the power instruction signal 310s remains to be "Low" for the predetermined period or longer (S711, Yes), the CPU 301 decides to apply the current power instruction and proceeds with the process to S719. The process of S719 and the subsequent steps will be omitted as previously mentioned.

Next, a case where the state of the power SW 313 is not OFF in S707 will be described.

If the CPU 301 determines that the state of the power SW 313 is not OFF in S707 (S707, No), the CPU 301 proceeds with the process to S712.

In S712, the CPU 301 checks whether or not there is an instruction for switching the power state via serial communication. If the CPU 301 determines that there is an instruction via serial communication (S712, Yes), the CPU 301 performs the process from S708 described above.

In contrast, if the CPU 301 determines that there is no instruction via serial communication (S712, No), the CPU 301 proceeds with the process to S713 described above.

In S713, the CPU 301 checks whether or not the logic of the power instruction signal 310s is in the "Low" state. The "Low" state of the power instruction signal 310s in this step means start of a power instruction via the power instruction signal 310s. If the logic of the power instruction signal 310s is not "Low" (S713, No), the CPU 301 returns the process to S705.

In contrast, if the CPU 301 determines that the logic of the power instruction signal 310s is "Low" (S713, Yes), the CPU 301 proceeds with the process to S714.

In S714, the CPU 301 performs the signal pattern determination process (FIG. 5) based on the detection period of the "Low" state of the power instruction signal.

After the end of the signal pattern determination using the power instruction signal 310s in S714, the CPU 301 proceeds with the process to S715.

In S715, the CPU 301 checks whether or not the instruction of the power state using a signal pattern is the "forced power OFF" instruction. If the CPU 301 determines that the instruction of the power state using a signal pattern is the "forced power OFF" instruction (S715, Yes), the CPU 301 performs the power-down process (S719).

In contrast, if the CPU 301 determines that the instruction of the power state using a signal pattern is not the "forced power OFF" instruction (S715, No), the CPU 301 proceeds with the process to S716.

In S716, the CPU 301 checks whether or not there is a difference between the instruction content of the power state via the power instruction signal 310s and the instruction content of the power state via the serial communication received in S712. Herein, the case where there is a difference includes a case where a power instruction via serial communication has not yet been received and an instruction via the power instruction signal 310s is present. If the CPU 301 determines that there is no difference between both the instructions of the power state, that is, if the instruction content via the serial communication and the instruction content via the power instruction signal 310s match each other (S716, No), the CPU 301 performs the power-down process in accordance with the instruction content (S719).

In contrast, if the CPU 301 determines that there is a difference in the instruction contents (S716, Yes), the CPU 301 proceeds with the process to S717.

In S717, the CPU 301 prioritizes the instruction of the power state via the power instruction signal 310s to switch the control content (performs a preparation process based on the power state in accordance with the power instruction via the power instruction signal 310s) and proceeds with the process to S718.

In S718, the CPU 301 monitors whether or not the logic of the power instruction signal 310s is in the "Low" state, which means that the power-down preparation of the operation unit 305 is completed. The CPU 301 repeats the process of S718 until confirming that the logic of the power instruction signal 310s is in "Low". If the CPU 301 determines that the logic of the power instruction signal 310s is in "Low" (S718, Yes), the CPU 301 proceeds with the process to S719 to perform the power-down process (S719). Since the process of S719 and the subsequent steps is the same as the process of S416 and the subsequent steps of FIG. 4 as previously mentioned, the description thereof will be omitted here.

The above is description of the control in the second embodiment.

Note that, although an instruction via the power instruction signal 310s is prioritized when instructions via the serial communication and the power instruction signal 310s differ from each other in the present embodiment, the embodiment is not limited thereto. For example, the instruction provided earlier may be prioritized out of instructions via the serial communication and the power instruction signal 310s.

As described above, according to the second embodiment, even when an instruction via serial communication is available, the final power mode can be switched in accordance with a notification pattern of the subsequent power instruction signal 310s. This enables a suitable process even when an instruction for the power state is provided via serial communication and, after the end of serial communication, the power state is then required to be further switched due to occurrence of an anomaly or the like.

Note that, although the description has been provided with an image forming apparatus in each of the above embodiments, the present invention is not limited to application to an image forming apparatus. For example, the present invention is applicable to various electronic devices having an instructing side that provides an instruction for switching the power state of an apparatus and a switching side that switches the power state of the apparatus in accordance with the instruction from the instructing side. Further, the instructing side and the switching side are connected to each other by a communication line (serial communication line or the like) that enables predetermined communication and a single signal line. Further, the instructing side is configured to notify the switching side of an instruction for switching the power state of the apparatus by using each of (both of) the predetermined communication via the communication line and a pattern of a signal output to the signal line. Furthermore, the switching side is configured to be able to receive, from the instructing side, the instruction for switching the power state of the apparatus by using each of (both of) the predetermined communication via the communication line and a pattern of a signal input from the signal line.

As set forth, each of the embodiments has the configuration that can provide a notification of an instruction for switching the power state by using each of (both of) communication via a serial communication line or the like and a pattern of a signal flowing in a single signal line and receive the instruction by using each of the communication and the pattern. Accordingly, an electronic device such as an image forming apparatus that can reliably switch the power state with an inexpensive configuration can be provided.

Note that, obviously, the configuration of various data and the content thereof described above are not limited to those described and may be configured in various configurations or contents in accordance with the use or the purpose.

Although one embodiment has been illustrated above, the present invention can take a form of an embodiment as a system, an apparatus, a method, a program, a storage medium, or the like, for example. Specifically, the present invention may be applied to a system formed of a plurality of devices or may be applied to an apparatus formed of a single device.

Further, all the configurations combining the embodiments described above fall in the present invention.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-009563, filed Jan. 25, 2021, which is hereby incorporated by reference herein in its entirety.

What is claimed is:

1. An electronic device configured to take a plurality of power states including a first power state and a second power state, the electronic device comprising:
   a first controller that controls a power state of the electronic device; and
   a second controller connected to the first controller via a serial communication line and a single signal line,
   wherein the first controller controls the power state of the electronic device into:
      the first power state in response to a first command being input via the serial communication line;
      the second power state in response to a second command being input via the serial communication line;
      the first power state in response to a first pattern signal being input from the single signal line; and
      the second power state in response to a second pattern signal being input from the single signal line, and
   wherein if power control indicated by a command input via the serial communication line is different from power control indicated by a signal pattern input from the single signal line, the first controller controls the power state of the electronic device so that the power state indicated by the signal pattern input from the single signal line is applied.

2. The electronic device according to claim 1, wherein the first pattern signal and the second pattern signal have different elapsed time, the elapsed time being a period of time taken by a signal flowing in the single signal line to change from a predetermined logic value to another logic value.

3. The electronic device according to claim 1, wherein a number of times that a logic value of a signal flowing in the single signal line is switched is different between the first pattern signal and the second pattern signal per a predetermined period.

4. The electronic device according to claim 1, wherein after receiving a command for power control via the serial communication line, the first controller controls the power state of the electronic device based on the command in response to switching of a logic value of a signal input from the single signal line.

5. The electronic device according to claim 1, wherein the second controller instructs the first controller to switch to a power saving state via the serial communication line or the single signal line.

6. The electronic device according to claim 1, wherein the second controller instructs the first controller to restart via the serial communication line or the single signal line.

7. The electronic device according to claim 1, wherein the second controller instructs the first controller for power off via the serial communication line or the single signal line.

8. The electronic device according to claim 1, wherein if a signal input from the single signal line continues a predetermined logic value for a predetermined period or longer, the first controller forcibly powers off the electronic device.

9. The electronic device according to claim 1, wherein the electronic device is an image forming apparatus.

10. An electronic device configured to take a plurality of power states including a first power state and a second power state, the electronic device comprising:
    a first controller that controls a power state of the electronic device; and
    a second controller connected to the first controller via a serial communication line and a single signal line,
    wherein the first controller controls the power state of the electronic device into:
       the first power state in response to a first command being input via the serial communication line;
       the second power state in response to a second command being input via the serial communication line;
       the first power state in response to a first pattern signal being input from the single signal line; and
       the second power state in response to a second pattern signal being input from the single signal line, and
    wherein if power control indicated by a command input via the serial communication line is different from power control indicated by a signal pattern input from the single signal line, the first controller controls the power state of the electronic device in accordance with information received earlier.

11. An electronic device configured to take a plurality of power states including a first power state and a second power state, the electronic device comprising:
    a first controller that controls a power state of the electronic device; and
    a second controller connected to the first controller via a serial communication line and a single signal line,
    wherein the first controller controls the power state of the electronic device into:
       the first power state in response to a first command being input via the serial communication line;
       the second power state in response to a second command being input via the serial communication line;
       the first power state in response to a first pattern signal being input from the single signal line; and
       the second power state in response to a second pattern signal being input from the single signal line,
    wherein the first controller is configured to:
       after receiving a command for power control via the serial communication line, if it is determined that a logic value of a signal input from the single signal line is switched and the logic value of the signal is not switched again within a predetermined period, control the power state of the electronic device based on the command, and
       after receiving the command for power control via the serial communication line, if it is determined that a logic value of a signal input from the single signal line is switched and the logic value of the signal is switched again within a predetermined period, control the power state of the electronic device based on power control indicated by a pattern of a signal subsequently input from the single signal line.

* * * * *

UNITED STATES PATENT AND TRADEMARK OFFICE
CERTIFICATE OF CORRECTION

| | | |
|---|---|---|
| PATENT NO. | : 11,997,238 B2 | Page 1 of 1 |
| APPLICATION NO. | : 17/568747 | |
| DATED | : May 28, 2024 | |
| INVENTOR(S) | : Keita Kobayashi | |

It is certified that error appears in the above-identified patent and that said Letters Patent is hereby corrected as shown below:

On the Title Page

Item (73) "CANON KABU SHIKI KAISHA, Tokyo (JP)" should read --CANON KABUSHIKI KAISHA, Tokyo (JP)--

Signed and Sealed this
Twenty-third Day of July, 2024

Katherine Kelly Vidal
*Director of the United States Patent and Trademark Office*